United States Patent
Mayne

[11] Patent Number: 5,858,119
[45] Date of Patent: Jan. 12, 1999

[54] ION EXCHANGE RESIN CLEANING METHOD

[76] Inventor: Michael D. Mayne, 1102 Holly St., Las Cruces, N. Mex. 88005

[21] Appl. No.: 442,860

[22] Filed: May 17, 1995

[51] Int. Cl.$^6$ .............................. B08B 3/08; B01J 49/00
[52] U.S. Cl. ........................... 134/32; 134/19; 134/25.1; 134/28; 134/29; 134/30; 134/34; 134/36; 210/670; 210/675; 210/677
[58] Field of Search ................... 134/19, 25.1, 25.5, 134/28, 29, 30, 32, 34, 36, 26; 210/670, 672, 673, 674, 675, 676, 677, 678

[56] References Cited

U.S. PATENT DOCUMENTS

| | | | |
|---|---|---|---|
| 3,262,876 | 7/1966 | Hronas et al. | 210/32 |
| 3,748,285 | 7/1973 | Wiltsey et al. | 252/531 |
| 3,831,754 | 8/1974 | Heskett | 210/80 |
| 3,849,196 | 11/1974 | Halloway et al. | 134/1 |
| 4,555,344 | 11/1985 | Cussler | 210/670 |
| 4,687,582 | 8/1987 | Dixon | 210/677 |
| 4,770,790 | 9/1988 | Oberhofer | 210/673 |
| 4,828,701 | 5/1989 | Cussler | 210/634 |
| 5,267,280 | 11/1993 | Duguesne | 376/260 |
| 5,297,683 | 3/1994 | Stengel, III | 209/17 |

*Primary Examiner*—Jan Ludlow
*Attorney, Agent, or Firm*—Felsman, Bradley, Gunter & Dillon, LLP

[57] ABSTRACT

A method for cleaning ion exchange resins. The ion exchange resin is circulated by a circulating medium within a circulation, system. The concentration of ions within a circulation medium is periodically changed at a selected point in the circulation system to change the amount of solution within the ion exchange for a period of time such that the amount of solution within the ion exchange resin fluctuates as the ion exchange resin circulates within the circulating system. The degree of cleaning of the resin an the quantity of chemicals required are both improved. Additionally, the ion exchange resin may be agitated for further cleaning.

27 Claims, 7 Drawing Sheets

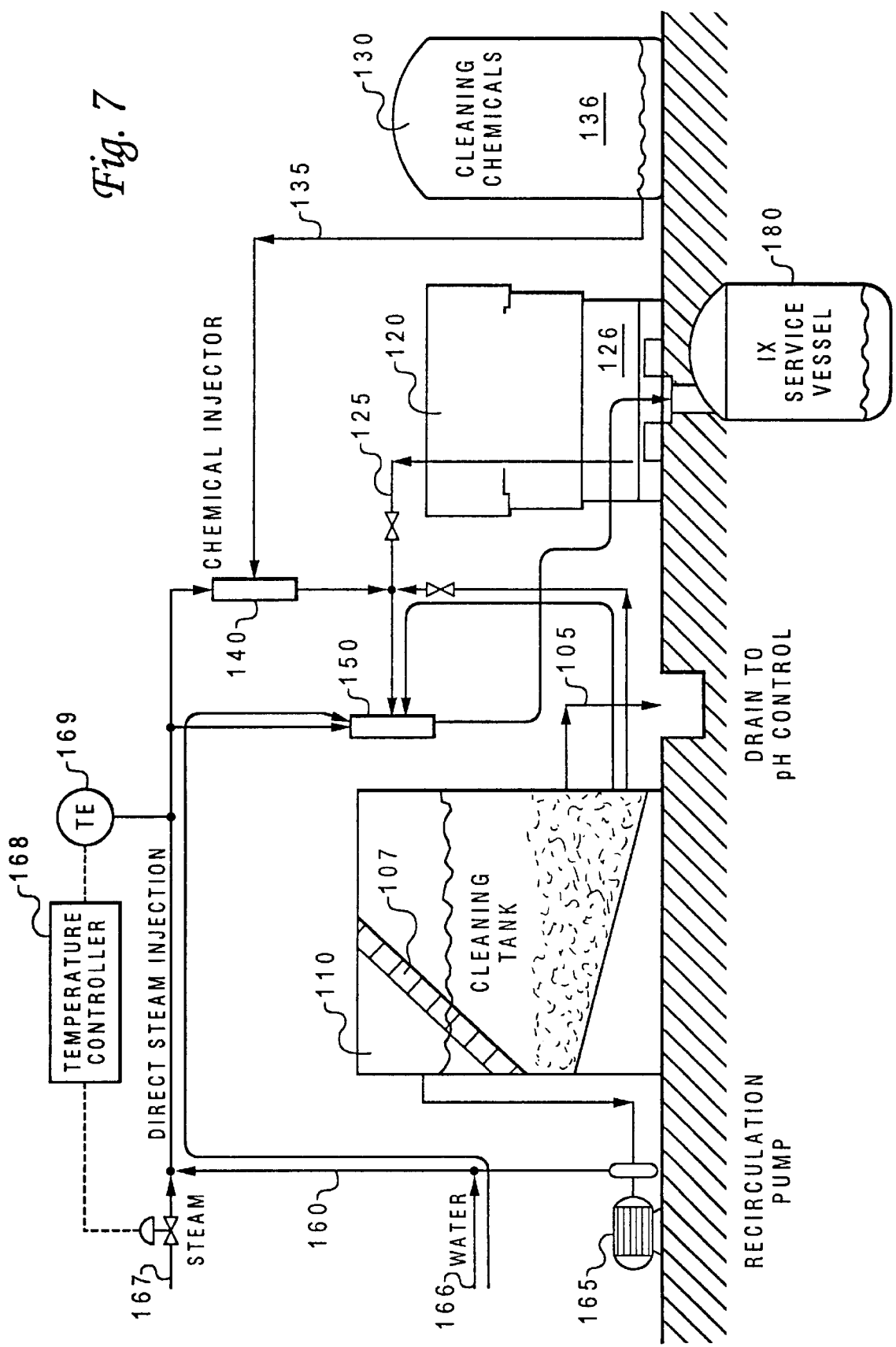

ION EXCHANGE RESIN CLEANING METHOD

BACKGROUND OF THE INVENTION

1. Technical Field:

The present invention relates to a resin cleaning system. Particularly, it relates to a system for cleaning ion exchange resins in water treatment plants.

2. Description of the Related Art:

The cleaning of ion exchange resins has been practiced for many years to improve the performance of fouled resin and lengthen its useful life. In water plants, in particular, a resin bed comprised of ion exchange beads is commonly used to remove impurities from water by passing the processed water over and through an ion exchange resin bed in order to remove contaminants.

The ion exchange bead can be compared in many ways to a sponge. A single resin bead that is removed from the bed, while appearing dry, actually may contain approximately 50%. water by weight. In addition, while the bead appears to be rigid and hard to the touch, it is actually very flexible and permeable to the water that passes through the resin bed. In fact, the water volume present in a resin bead at any time may vary by more than 30% in common water treatment applications. This change in water volume is driven by the flux created by the difference in concentration of ions in the solution surrounding the bead and the type of ion that is loaded on to the resin's active sites by the solution. As a result, the resin beads can respond almost like a sponge in that they can be "squeezed", i.e., they can have solution flushed from the surface and interior of the bead through varying ion concentration, concentration of cleaning chemicals, and temperature.

The majority of water treatment plants do not have a separate vessel for cleaning so that this cleaning occurs in the service vessel. In addition, current cleaning methods rely on the use of cleaning chemicals that act as a solvent to clean the beads. For example, one presently used method for removing organics from anion exchange resins employs strong base anion and weak anion resin types. Organics are removed by backwashing the resin bed at the regular flow rate and then draining to bed level. Then, the resin is air lanced for thirty minutes at four cubic feet of air per minute, per cubic foot of resin, backwashed at a regular flow rate for twenty minutes, and then drained to bed level. Next, 10 gallons brine and caustic solution is added at 140° F. per cubic foot of resin. The brine and caustic solution is allowed to soak for two to three hours. Thereafter, the resin is rinsed with a down flow of two gallons per minute, per cubic foot of resin with clean water for fifteen minutes, and the treatment is repeated if necessary. Afterwards, the resin bed is backwashed at the regular flow rate for ten minutes. Then the resin is rinsed and regenerated, and the unit is returned to service.

While several conventional methods have agitation, such as air agitation, this type of agitation provides very little physical movement of the resin when compared to the hydraulic jet used in the bead jet. Air lancing is also labor intensive and may damage the service vessel internals. Greater agitation that might be provided by a centrifical pump or propelled type mixer is known to damage the ion exchange resin. While conventional methods may recirculate the cleaning chemicals through the ion exchange resin, there are no current methods that take advantage of the repeated squeezing phenomena that can be imposed on the resin beads without using large amounts of cleaning chemicals in repeated conventional cleanings.

Currently, the prior art does not provide a system that efficiently provides physical cleaning of the resin without scratching or otherwise damaging the ion exchange resin.

SUMMARY OF THE INVENTION

The present invention provides a method and system of improving the cleaning of ion exchange resins beyond the results obtained using current methods in water treatment plants. The invention virtually eliminates scratching of the resin and other damage caused by improper handling of the resin during cleaning operations. It imposes a variance of ion concentration throughout the method that creates a repeated squeezing phenomena, without using large amounts of cleaning chemicals, thereby enhancing the overall efficiency and efficacy of the cleaning process. Because of the cost of the cleaning chemicals, a typical cleaning only squeezes the resin one or two times.

Generally, the present invention is a method of, and apparatus for, cleaning ion exchange resin, either cationic or anionic, containing some amount of solution. This solution will typically be an aqueous solution. The ion exchange resin is circulated in a circulating medium or carrier medium in a manner that fluctuates the ion concentration in the beads such that a repeated squeezing phenomena occurs that enhances the flushing of the cleaning solution and the contaminants in the resin beads through, and out of, the resin beads. The much higher than average concentration of the cleaning chemicals at the injection point and in the adjoining piping also has a beneficial effect on cleaning. Further, the changing of the size of the bead as the squeezing effect occurs will also encourage the dislodging of scale and other material from the surface of the ion exchange resin beads.

More particularly, the present invention is a method of combining, in a cleaning vessel, ion exchange resin with a carrier medium, comprised of cleaning chemicals and water, and recirculating the carrier medium and resin. The ion exchange resin and carrier medium are recirculated in a closed loop wherein a stream of carrier medium is pumped into the resin recirculation stream. This drawn-off carrier medium is typically introduced to the recirculation stream using an eductor. The eductor serves the dual purpose of agitating the resin beads and drawing the ion exchange resin through the resin recirculation stream and back into the cleaning vessel.

Separation of the resin from the carrier medium in the cleaning vessel is enhanced by the use of a baffle to dissipate the disturbance caused by the resin and carrier medium re-entering the vessel. It is important that all resin larger than a chosen minimum size (usually 300 microns for typical water treatment resin) be kept away from the suction of the circulation pump. A reasonable differential between the density of the resin bead and the cleaning solution must be maintained. For example, gel type strong base anion resin, which has a density of 1.1. grams per milliliter, can be effectively separated from 7.5 percent sodium chloride brine, with a density of 1.05 grams per milliliter, using a baffle constructed of light weight plastic tubes 12 inches long. The tubes must be mounted at a 45 degree angle and the liquid flux through this baffle preferably is less than 1.5 gallons per square foot per minute. There are many other types of baffles that may be used that are commonly used to separate solids from liquids. If resin is not settling, the density differential must be increased. This is usually accomplished by reducing the cleaning chemical concentration or by reducing the carrier medium flow rate.

Cleaning chemicals may be introduced at any point in the process during the cleaning of the resin. Cleaning chemicals are those common in the art. For example, an anionic resin cleaning chemical may be comprised of less than 10% sodium chloride and less than 2% sodium hydroxide. A cationic resin cleaning chemical may be comprised of less than 10 hydrochloric acid and a surfactant.

Typically, the cleaning chemicals will be introduced in one of three places: the resin recirculation stream before the drawn-off carrier medium is introduced, the resin recirculation stream after the drawn-off carrier medium is introduced, and directly into the drawn-off carrier medium before the drawn-off carrier medium is introduced to the resin recirculation stream. Introduction of the cleaning chemicals at each of these three points creates varying strengths of the "squeezing" action that occurs as a result of the changing ion concentration caused by the chemicals. A varying intensity of the squeezing action may be desirable depending on the age and condition of the resin, the size of the resin, the amount of cleaning that is required, the total amount of cleaning chemical that must be added, and other factors, some of which must be learned by experience in cleaning a particular resin. In addition, heat may be applied to the process, most typically using steam or an electrical heater, by heating the drawn-off carrier medium stream. The application of steam or other heating to the drawn-off carrier medium reduces the risk of thermal degradation of the ion exchange resin and provides very even heating of the cleaning system. The application of cleaning chemicals and heat may occur periodically during the cleaning process depending on the application and may occur at the same time or at varying times.

These and other features and advantages of the present invention will become more apparent to those skilled in the art when considered in light of the following description.

The above, as well as additional objectives, features, and advantages of the present invention, will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a sectional side view of the ion exchange resin cleaning system showing the method of removing and storing the cleaned, rinsed ion exchange resin.

DETAILED DESCRIPTION OF PREFERRED EMBODIMENT

Figure 1:
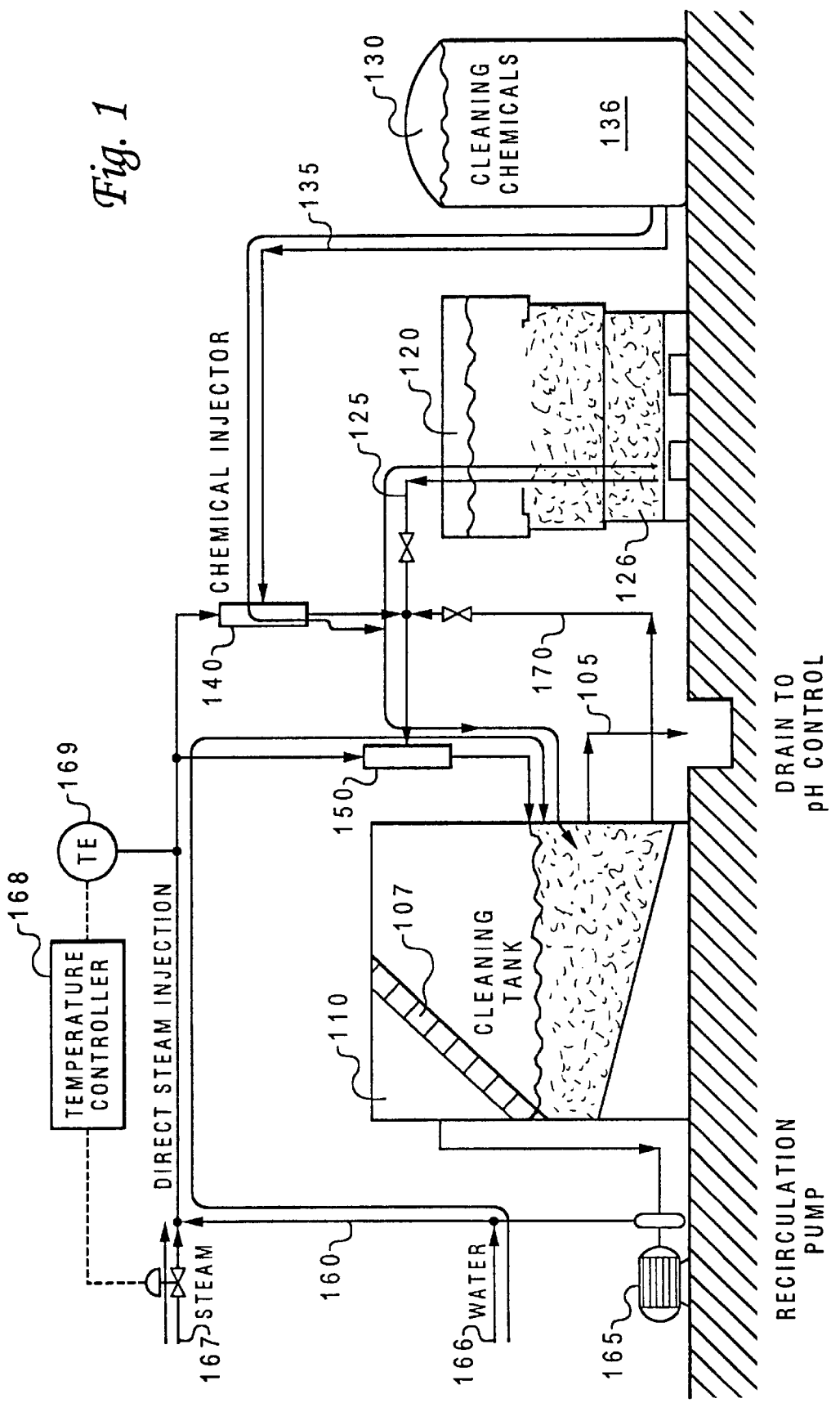
FIG. 1 is a sectional side view of an ion exchange resin cleaning system utilizing the method of, and representing an apparatus of, the present invention.

With reference now to the figures, and in particular with reference to FIG. 1, a diagram in sectional view of anion exchange resin cleaning system 100 is illustrated. Ion exchange resin system 100 includes a cleaning tank 110 with a drain 105 and a baffle 107, an ion exchange resin storage box 120, an ion exchange resin loading line 125, an ion exchange resin 126, a cleaning chemicals storage tank 130, a cleaning chemicals line 135, cleaning chemicals 136, a chemical injector 140, an ion exchange resin jet eductor 150, a carrier medium draw-off line 160, a draw-off pump 165, a water inlet 166, a steam inlet 167, a temperature controller 168, a thermocouple 169, and an ion exchange resin recirculation line 170.

In the method of the current invention, ion exchange resin 126 is pumped from the ion exchange resin storage tank 120 through the ion exchange resin loading line 125 into the cleaning tank 110. Water, introduced into the cleaning tank through the water inlet 166, and cleaning chemicals, introduced through the cleaning chemicals line 135, are then added to the resin to form a carrier medium and begin cleaning the resin. Alternatively only water is initially added to cleaning tank 110. Water added to the cleaning tank may be heated through the introduction of steam, introduced into the system at the steam inlet 167, and/or through electrical heating (not shown).

Figure 2:
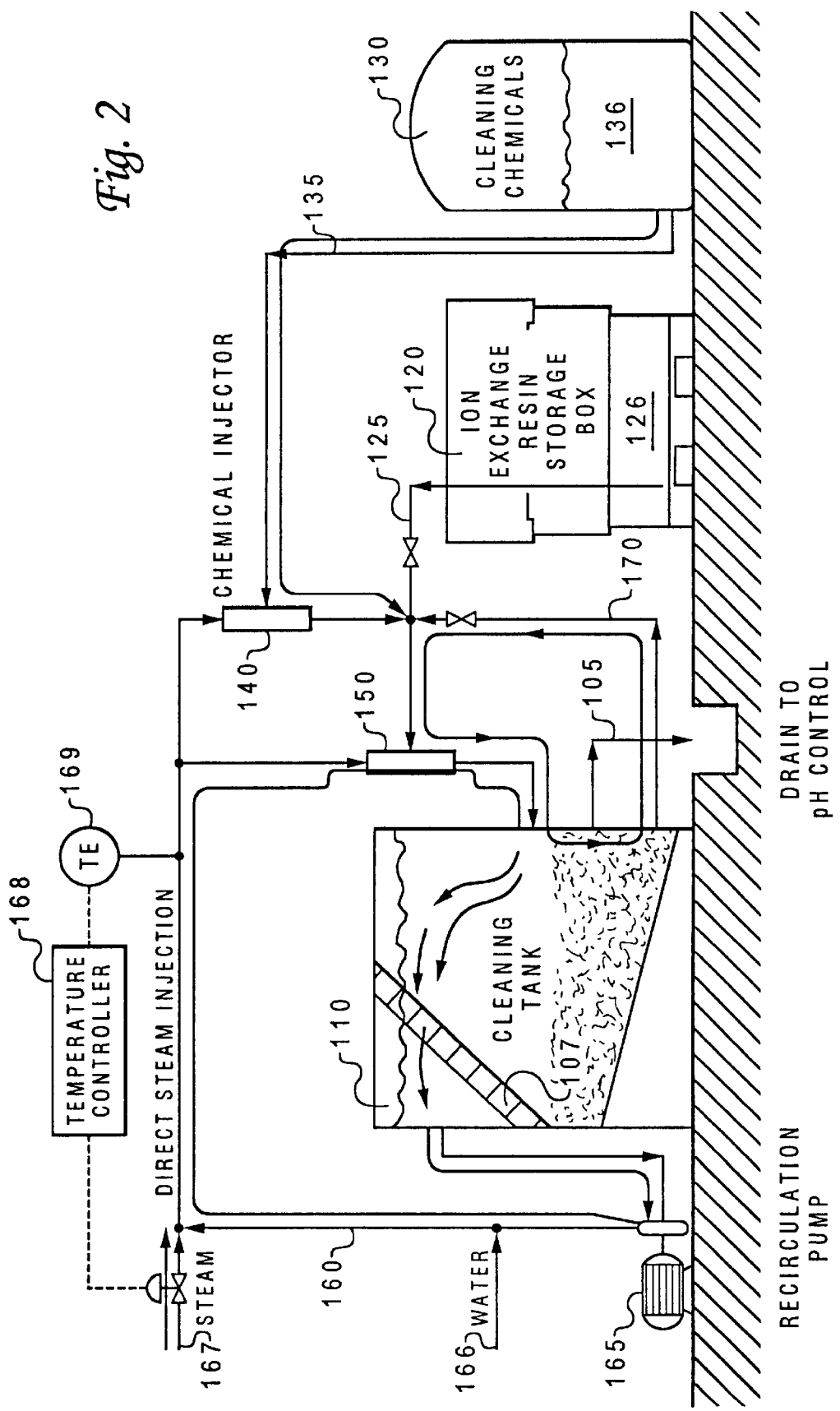
FIG. 2 is a sectional side view of the ion exchange resin cleaning system showing the method of cleaning the resin during the cleaning cycle of the current invention.

FIG. 2 is a diagram in sectional view of the ion exchange resin cleaning system 100 after the requisite amount of resin and carrier medium have been added to the cleaning tank 110. The addition of cleaning chemicals and the resultant cleaning of the resin continues.

The cleaning cycle is comprised of two streams, the first of which is the recirculation of a portion of the carrier medium being drawn-off the top, typically, of the cleaning tank 110 with little or no ion exchange resin. A baffle is used to insure complete separation of the resin from the cleaning solution. This drawn-off carrier medium is circulated through the carrier medium draw-off line 160 by the pump 165. Placing the pump suction at this point allows the recirculation to be driven from a point where there is little or no ion exchange resin present that can be damaged by, or interfere with, the operation of the pump. Make up water, as required to make up for any incidental loss of, or need for, water during the cleaning of the resin, may be supplied at the water inlet 166 or the steam inlet 167.

The temperature of the system is controlled by the application of heat in the carrier medium draw-off line through the introduction of steam at steam inlet 167, or with an electrical heater (not shown). The control of heat at this point, because little or no ion exchange resin being present, helps prevent any damage to the ion exchange resin due to spot heating. Even heating of the resin using most standard cleaning methods is not typical because it requires heating and recirculation equipment not normally available on a standard water treatment unit. Often the cleaning solutions are over heated knowing the solution will cool when it contacts the resin. This over heating can damage the resin. The cleaning method used previously often recommends heating to 140° F. when many resin manufactures do not recommend using this resin above 130° F.

A thermocouple 169 is connected to the temperature controller 168 that controls the input of steam at the steam inlet, or to a rheostat or similar device on the electrical heater (not shown).

The second stream that comprises the cleaning cycle is the recirculation of the ion exchange resin and the carrier medium in anion exchange resin recirculation line 170. Additional cleaning chemicals 136 and the drawn-off portion of the carrier medium in the carrier medium draw-off line 160 will be added to the ion exchange resin 126 and the carrier medium in the ion exchange resin circulation line 170 prior to the mixture being returned to cleaning tank 110.

Typically, the introduction of cleaning chemicals 136 is through a chemical injector 140 (if more concentrated cleaning chemicals are required, a positive displacement or other pump may be used to replace the chemical injector 140), and the introduction of the drawn-off carrier medium is through the ion exchange resin jet eductor 150. The use of the eductor 150 provides physical agitation of the resin and aids in the cleaning process without damaging the ion exchange resin. It also provides the additional advantage of eliminating the need for an additional pump in the ion exchange resin line 125 because the carrier medium draw-off line 160 provides a solution drive to the eductor, which creates a suction of the ion exchange resin and carrier medium in the ion exchange resin line 125.

The use of the eductor to drive the recirculation of the ion exchange resin, and the resulting elimination of an additional pump in the ion exchange resin line, allows the recirculation of the resin through the recirculation loop without the need for an additional pump that could otherwise damage the ion exchange resin. Other devices that can provide agitation of the ion exchange resin and create circulation in ion exchange resin recirculation line 170 may be employed according to the present invention.

Figure 3:
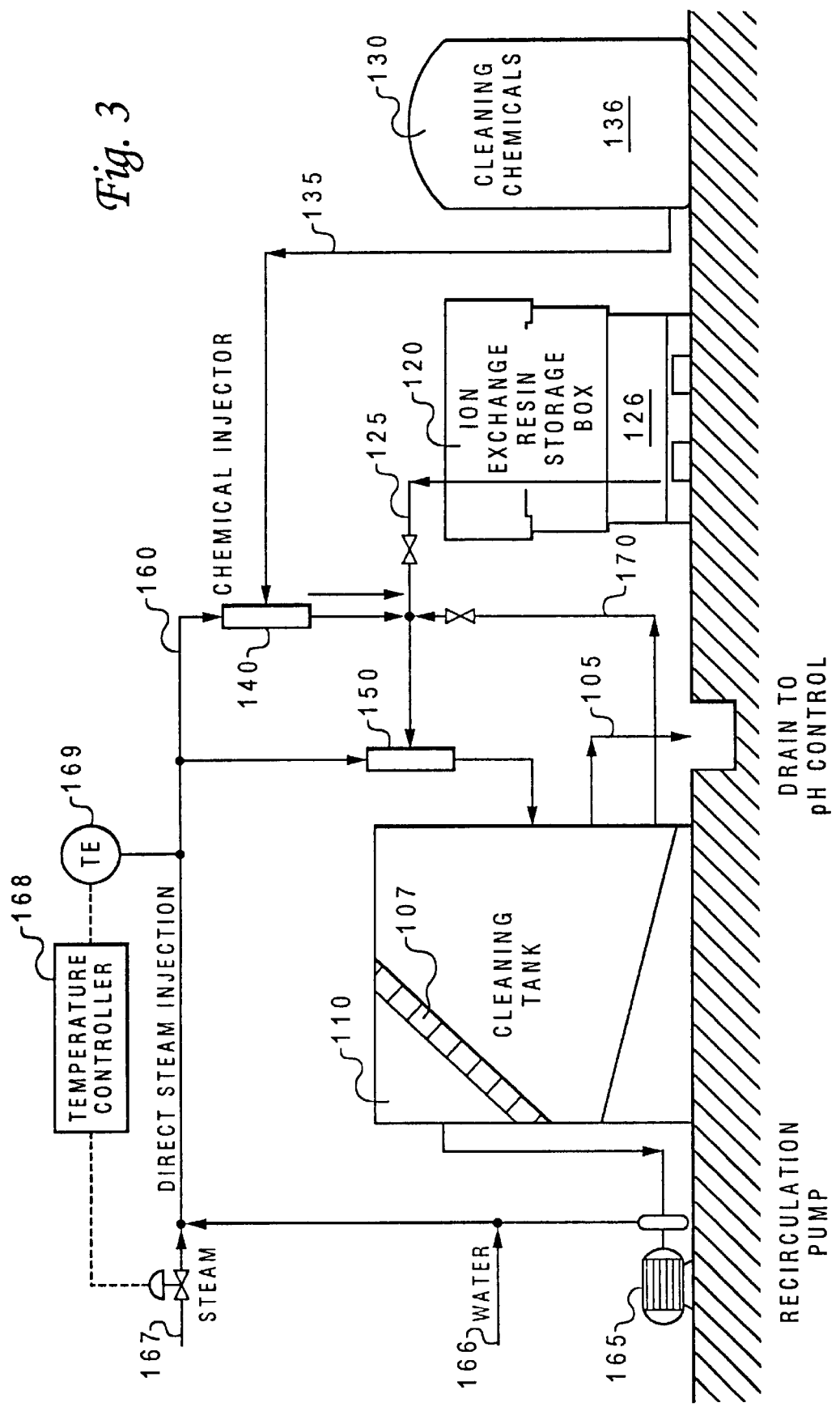
FIG. 3 is a sectional side view of the ion exchange resin cleaning system showing the method of cleaning the resin during the cleaning cycle of the current invention, wherein the chemical injection occurs before the ion exchange resin eductor.
Figure 4:
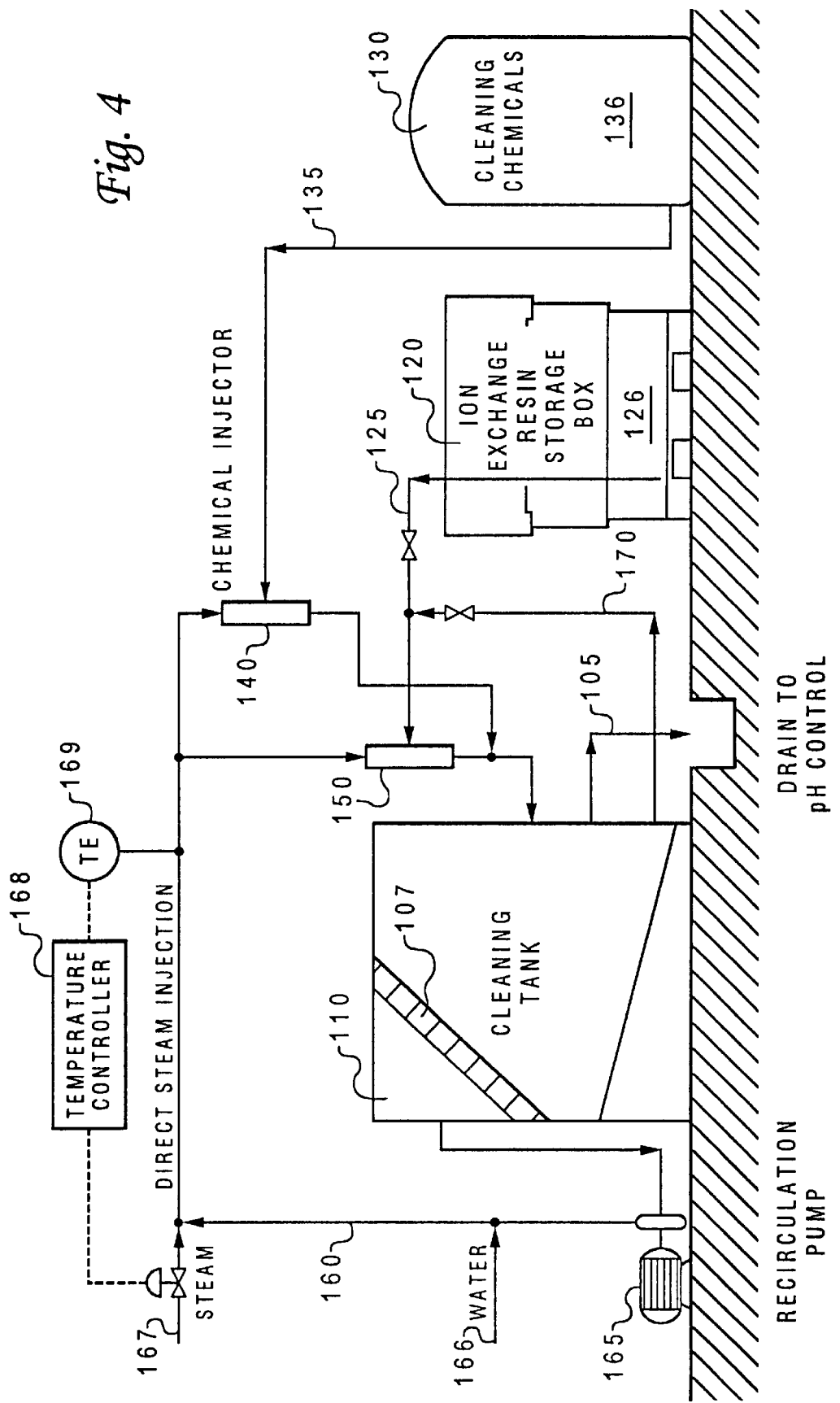
FIG. 4 is a sectional side view of the ion exchange resin cleaning system showing the method of cleaning the resin during the cleaning cycle of the current invention, wherein the chemical injection occurs after the ion exchange resin eductor.

Injection of the cleaning chemicals may occur before, after, or at any location in the ion exchange resin line 170 to the ion exchange resin jet eductor as illustrated in FIGS. 3 and 4. In addition, the placement of the chemical injector may be in carrier medium draw-off line 160 before that stream enters the ion exchange resin jet eductor as illustrated in FIG. 7.

Placement of the chemical injection point at the various locations has an effect on the intensity of the squeeze effect by varying the intensity of the change in ion concentration. The intensity is also adjusted by varying the length and diameter of the resin recirculation piping. For example, the introduction of the cleaning chemicals directly into the ion exchange resin line before the ion exchange resin jet eductor 150 creates the hardest "squeezing" action. As seen in FIG. 3, the chemicals will typically be injected using a positive displacement pump (see FIG. 5), an eductor or other venturi device that utilizes a side stream of the carrier medium draw-off line.

As shown in FIG. 3, the chemical injection point may also be in the discharge from the ion exchange resin jet eductor before the ion exchange resin line returns to the cleaning tank. This injection point provides a very light squeeze effect with shorter chemical contact time.

As shown in FIG. 4, the chemical injection point may also be in the carrier medium draw-off line. This drive water injection provides a very well mixed and dilute cleaning chemical addition with a longer relative contact time. This injection also provides a relatively light squeeze. In most cases for this injection point, it is preferable because of relative pressures in the conduits to use a pump to replace the chemical injector.

The introduction of cleaning chemicals will, during ordinary operation, be continuous until the desired concentration of chemicals is reached. Depending on the application, the additional of cleaning chemicals may, however, occur periodically, until a certain concentration of cleaning chemicals is obtained, or may vary over the duration of the cleaning cycle. In addition, heat may be applied throughout the cycle, periodically, at varying intensities, or not at all. It should be noted that heating and cleaning chemical injection methods may be interrelated, and changes in heating and the injection of chemicals may occur in conjunction with each other as the cleaning cycle continues.

There are several types of cleaning chemicals which are well known in the art. For example, the cleaning chemical used in the cleaning of an cationic exchange resin may be a solution of not more than 10% hydrochloric acid and a common surfactant. When cleaning a anion resin, the cleaning chemical may be comprised of a solution such as less than 10% sodium chloride and less than 2% sodium hydroxide. There are many other types of cleaning chemicals that are well known in the art.

Table 1 below lists different types of cation exchange resin systems along with the type of contamination encountered and the cleaning agents employed. Table 2 is similar table for anion exchange resin.

TABLE 1

CLEAN-UP PROCEDURES FOR CATION EXCHANGE RESINS

| System | Contamination | Cleaning Agents |
|---|---|---|
| Softener | Iron, Manganese (40 to 300 gm/cu.ft) | Brine and sodium hydrosulfite |
| Softener | Iron, Manganese (25 gms/cu.ft) | Brine and sodium hydrosulfite |
| Softener | Iron, Manganese Silica, Aluminum | Caustic followed by brine and sodium hydrosulfite |
| Softener Demineralizer | Barium, Calcium Strontium | Hydrochloric acid |
| Softener Demineralizer | Organic Fibers | Brine |
| Softener Demineralizer | Silica, Aluminum | Caustic |
| Softener Demineralizer | Oil | Non-ionic detergent (such as Triton x 100) |
| Softener Demineralizer | organics | Brine and caustic |
| Softener Demineralizer | Silica; Aluminum | Caustic |
| Softener | Iron, Managese | Brine and Sulfamic acid |

TABLE 2

CLEAN-UP PROCEDURES FOR ANION EXCHANGE RESINS

| System | Contamination | Cleaning Agents |
|---|---|---|
| Demineralizer Organic trap | Iron, Calcium Magnesium | Hydrochloric Acid |

TABLE 2-continued

CLEAN-UP PROCEDURES FOR ANION
EXCHANGE RESINS

| System | Contamination | Cleaning Agents |
| --- | --- | --- |
| Dealkalizer Demineralizer Organic trap | Silica, Organics | Brine and caustic |
| Dealkalizer Demineralizer Organic trap Dealkalizer Demineralizer Organic trap Dealkalizer | Silica, Iron Organics, Calcium Organics | Hydrochloric acid, brine and caustic brine and caustic |
| Demineralizer Organic trap Dealkalizer | Organics | Brine and sodium hypochlorite |

Figure 5:
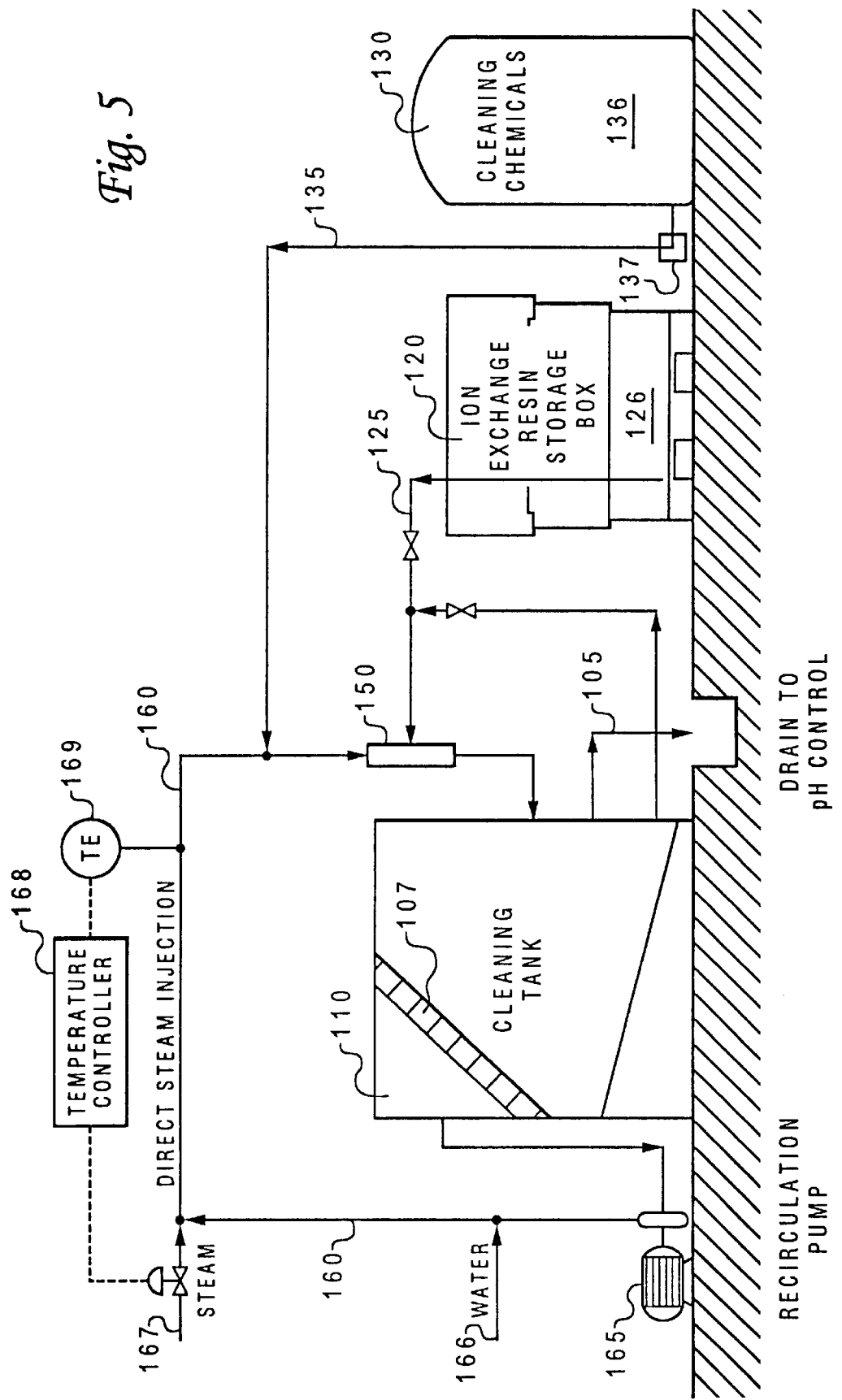
FIG. 5 is a sectional side view of the ion exchange resin cleaning system showing the method of cleaning the resin during the cleaning cycle of the current invention, wherein the chemical injection occurs, using an injection pump, to replace the chemical injector in the drive water in the carrier medium draw off line.

The exchange resin systems and the types of contaminations encountered found in Table 1 and Table 2 are examples of situations in which the present invention may be applied to more efficiently clean ion exchange resins in these types of systems. As illustrated in FIG. 5, cleaning chemicals 136 are pumped through cleaning chemicals line 135 into carrier medium draw-off line 160 at a location prior to ion exchange resin jet eductor 150. Pump 137 is a positive displacement pump in the depicted example.

Figure 6:
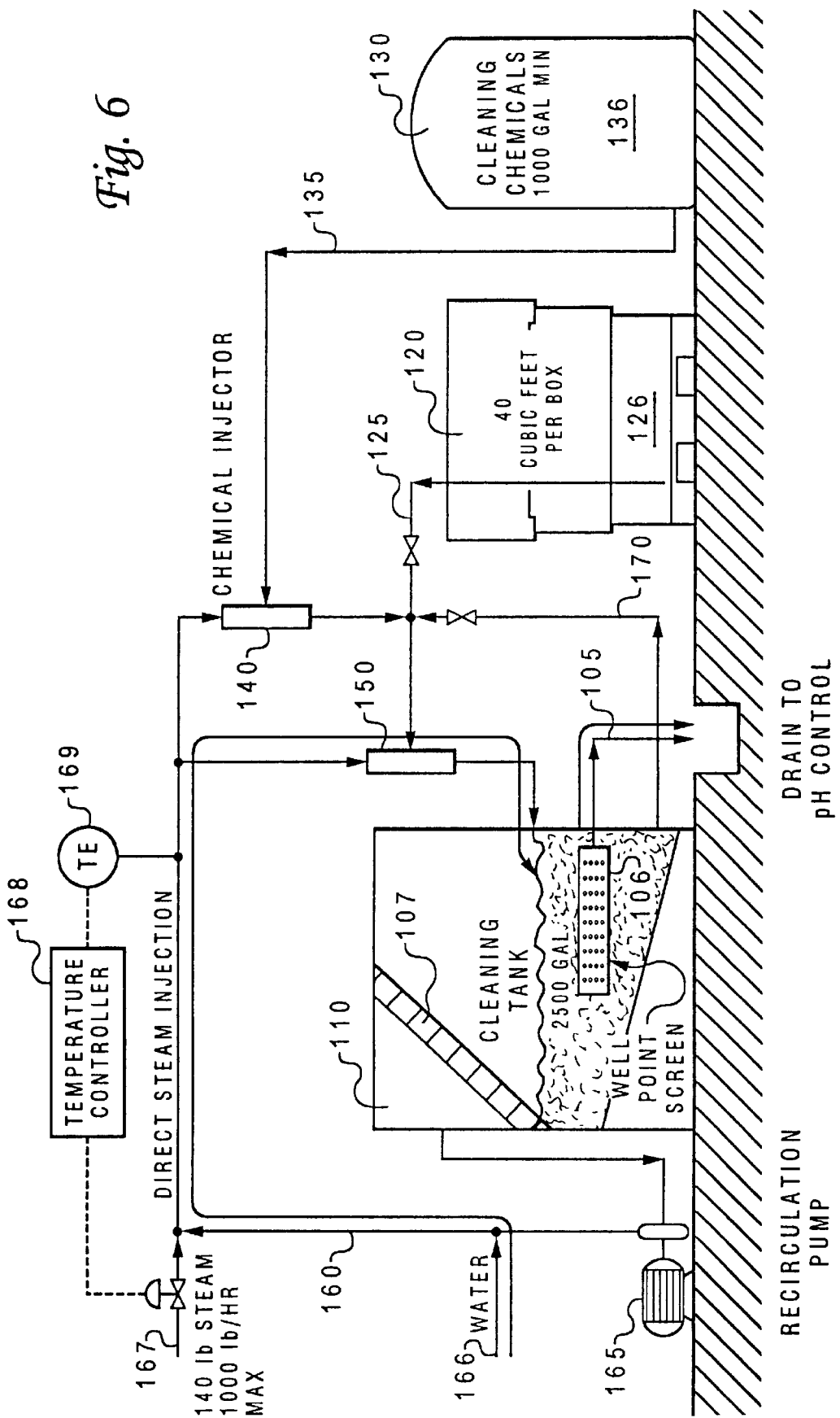
FIG. 6 is a sectional side view of the ion exchange resin cleaning system showing the method of rinsing the ion exchange resin during the rinsing cycle of the current invention.

As shown in FIG. 6, at the end of the cleaning cycle, the carrier medium optionally may be drained from the cleaning tank 110 to drain 105 after passing through a well point screen 106 that prohibits the passage of ion exchange resin. The carrier medium is directed to a pH controlled sewer for neutralization. The rinse cycle continues by refilling the cleaning tank 110 with fresh water from the water inlet 166.

In the final cycle of the cleaning process, water from the water inlet 166 is driven through the ion exchange resin jet eductor 150, which pulls the clean resin and water through the ion exchange resin line 125. The discharge from the ion exchange resin eductor is rerouted to a service vessel not shown in FIG. 6 or other storage for clean resin (not shown).

In a preferred embodiment, the cleaning tank 110 is a 2,500 gallon tank measuring 9 feet×4 feet×12 feet with a capacity to clean about 150 cubic feet. The ion exchange resin storage box 120, one of four (three not shown) has a capacity of 40 cubic feet. Cleaning chemicals are pumped at a maximum flow rate of 50 gallons per minute from the cleaning chemicals tank 130 by a cleaning chemical pump 137. The temperature of the system is controlled through a temperature controller 168 in the carrier medium draw-off line 160. It is connected to a typical thermocouple 169. The temperature controller is linked to, and controls, the introduction of steam at the steam inlet 167. The temperature controller is used to maintain the draw-off line at a temperature ranging from ambient temperatures to 130 degrees F, depending on the application.

Also in a preferred embodiment, draw-off pump 165 is a centrifugal pump. In particular, in the depicted embodiment, draw-off pump 165 is a series 2,000 corrosion resistant centrifugal pump available from Corcoran Company located in New Lenox, Ill. A number of different types of eductors available may be employed for eductor 150. For example, eductors from such as, for example, LM model plastic eductor from Penberthy Division, of Houdille Industries, Inc., located in Prophetstown, Ill. may be employed according to a preferred embodiment of the present invention.

The piping in the resin recirculation line should be designed with a larger pipe size than is typical for water flow. Resin slurry velocity should be less than 3 feet per second and all pipe ends that are perpendicular to flow direction should be beveled. Higher velocities may be used with discretion in long straight runs of pipe, in tubing without fittings, and in conduits that have a very smooth inside surfaces.

The invention provides a system, methods and apparatus for cleaning ion exchange resins. It provides several advantages over other known systems in that it takes advantage of the repeated squeezing phenomena of the resin beads that occurs when the ion concentration changes in an ion exchange resin. The squeezing phenomena, caused by the changing ion concentration in the ionic form of the bead and the resulting change in size of the bead, aids in cleaning the ion exchange resin by driving contaminates out of the resin beads while dislodging solid contaminants from the surface of the resin beads. This squeezing phenomena is achieved in a manner that allows the ion exchange resin to be circulated with little or no degradation of the resin during cleaning by using an eductor to drive the circulation of the ion exchange resin. The eductor driven circulation also provides the additional advantage of agitation and optionally heating of the ion exchange resin at or near the time of the addition of cleaning chemicals, thereby aiding in the flux of contaminants from and off of the ion exchange resin. These advantages and features are employed while using a lesser amount of cleaning chemicals than would be required by conventional cleaning methods. The invention, in taking advantage of all of its unique features, thereby provides an improved way of cleaning ion exchange resins.

While the invention has been particularly shown and described with reference to a preferred embodiment, it will be understood by those skilled in the art that various changes in form and detail may be made therein without departing from the spirit and scope of the invention.

What is claimed is:

1. A method of cleaning contaminants from an ion exchange resin comprising the steps of:
   introducing the ion exchange resin to a cleaning vessel;
   introducing cleaning chemicals and water to the cleaning vessel, wherein a carrier medium is formed;
   drawing off carrier medium without resin; and
   recirculating the ion exchange resin and carrier medium, as a resin recirculation stream, comprising the steps of:
      drawing off ion exchange resin and carrier medium from the cleaning vessel to form the resin recirculation stream;
      injecting the drawn-off carrier medium without resin into the resin recirculation stream to form a combined resin recirculation stream, wherein the drawn-off carrier medium agitates the resin beads and changes an ionic concentration in the resin recirculation stream, thereby changing the volume of the resin beads and removing contaminants therefrom; and
   reintroducing the combined resin recirculation stream to the cleaning vessel.

2. The method of claim 9, wherein the drawn-off carrier medium is drawn off into a circulation system and is infected at a location within the circulation system and wherein the step of injecting additional cleaning chemicals occurs at a location after the location of the step of injecting the drawn-off carrier medium.

3. The method of claim 1 further comprising:
   injecting additional cleaning chemicals into the drawn-off carrier medium; and injecting the drawn-off carrier medium with additional cleaning chemicals into the resin recirculation stream.

4. The method of claim 1, further comprising rinsing the ion exchange resin.

5. The method of claim 1, wherein the ion exchange resin is a cationic resin.

6. The method of claim 2, wherein the cleaning chemicals are comprised of not more than 10% hydrochloric acid and a surfactant.

7. The method of claim 1, wherein the ion exchange resin is an anionic resin.

8. The method of claim 7, wherein the cleaning chemicals are comprised of less than 10% sodium chloride and less than 2% sodium hydroxide.

9. The method of claim 1, further comprising the step of injecting additional cleaning chemicals into the resin recirculation stream.

10. The method of claim 9, wherein the step of injecting cleaning chemicals continues until a selected concentration of the cleaning chemicals has been added to the carrier medium.

11. The method of claim 9, wherein the step of injecting cleaning chemicals occurs periodically.

12. The method of claim 9, wherein the drawn-off carrier medium is drawn off into a circulation system and is infected at a location within the circulation system and wherein the step of injecting additional cleaning chemicals occurs at a location which is before the location in the circulation system of the step of injecting the drawn-off carrier medium.

13. The method of claim 9, wherein the drawn-off carrier medium is drawn off into a circulation system and is injected at a location within the circulation system and wherein the step of injecting additional cleaning chemicals occurs at the same location as the step of introducing the drawn-off carrier medium.

14. The method of claim 1, further comprising the step of heating the drawn-off carrier medium.

15. The method of claim 4, wherein the heating of the drawn-off carrier medium is accomplished by introducing steam.

16. The method of claim 14, wherein the step of injecting additional cleaning chemicals occurs for a time period and then the step of heating occurs for a time period.

17. The method claim 14 wherein the step of heating occurs for a time period and then the step of injecting additional cleaning chemicals occurs for a time period.

18. The method of claim 14 wherein the step of heating and the step of injecting additional cleaning chemicals occur during the same time period.

19. The method of claim 14 wherein the step of heating and the step of injecting additional cleaning chemicals occur during the same time period at a location in the resin recirculation stream.

20. A method of cleaning contaminants from ion exchange resin containing resin beads, the method comprising:

introducing the ion exchange resin into a container;

introducing a carrier medium into the container;

drawing off a portion of the carrier medium without the ion exchange resin to form a first stream;

drawing off a portion of the carrier medium with the ion exchange resin to form a second stream;

combining the first stream with the second stream to form a combined stream, wherein the resin beads are agitated and changes an ionic concentration in the combined stream, thereby changing the volume of the resin beads and removing contaminants therefrom; and introducing the combined stream back into the container.

21. The method of claim 20 further comprising combining cleaning chemicals with the combined stream to change an amount of solution within the resin beads, wherein the amount of solution within the resin beads again changes after the combined stream returns to the container and is diluted by the carrier medium in the container.

22. The method of claim 20 further comprising combining cleaning chemicals with the second stream to change an amount of solution within the resin beads, wherein the amount of solution within the resin beads again changes after the combined stream returns to the container and is diluted by the carrier medium in the container, resulting in changes in volume of each resin bead.

23. The method of claim 20 further comprising combining cleaning chemicals with the first stream to change an amount of solution within the ion exchange resin beads, wherein the amount of solution within the ion exchange resin beads again changes after the combined stream returns to the container.

24. The method of claim 20 further comprising combining cleaning chemicals with the combined stream during the step of combining the first stream with the second stream to change an amount of solution within the resin beads, wherein the amount of solution within the resin beads again changes after the combined stream returns to the container.

25. A method of removing, contaminants from an ion exchange resin comprising:

introducing the ion exchange resin into a container with a circulating medium, wherein the ion exchange resin comprises resin beads;

removing the resin beads with a portion of the circulating medium from the container to form a circulation stream;

circulating the circulation stream along a path having a beginning and an end, wherein the circulation stream is formed at the beginning of the path;

returning the circulation stream to the container at the end of the path; and changing a concentration of ions within the circulating medium in the circulation stream during the circulating step, wherein an amount of solution within the resin beads within the circulation stream fluctuates as the resin beads circulates such that the volume of the resin beads changes and contaminants are removed from the resin beads as the solution flows out of the resin beads.

26. The method of claim 25 further comprising drawing off circulating medium from the container and introducing the drawn-off circulating medium into the circulation stream such that the resin beads are agitated, wherein the agitation of ion exchange resin beads aids in removing contaminants from the resin beads.

27. The method of claim 25 wherein the changing step comprises adding cleaning chemicals to the circulation stream to change the concentration of ions in the circulating medium.

* * * * *